Jan. 27, 1948.  P. C. TEMPLE  2,435,057
PRESSURE REGULATING VALVE
Filed May 14, 1943
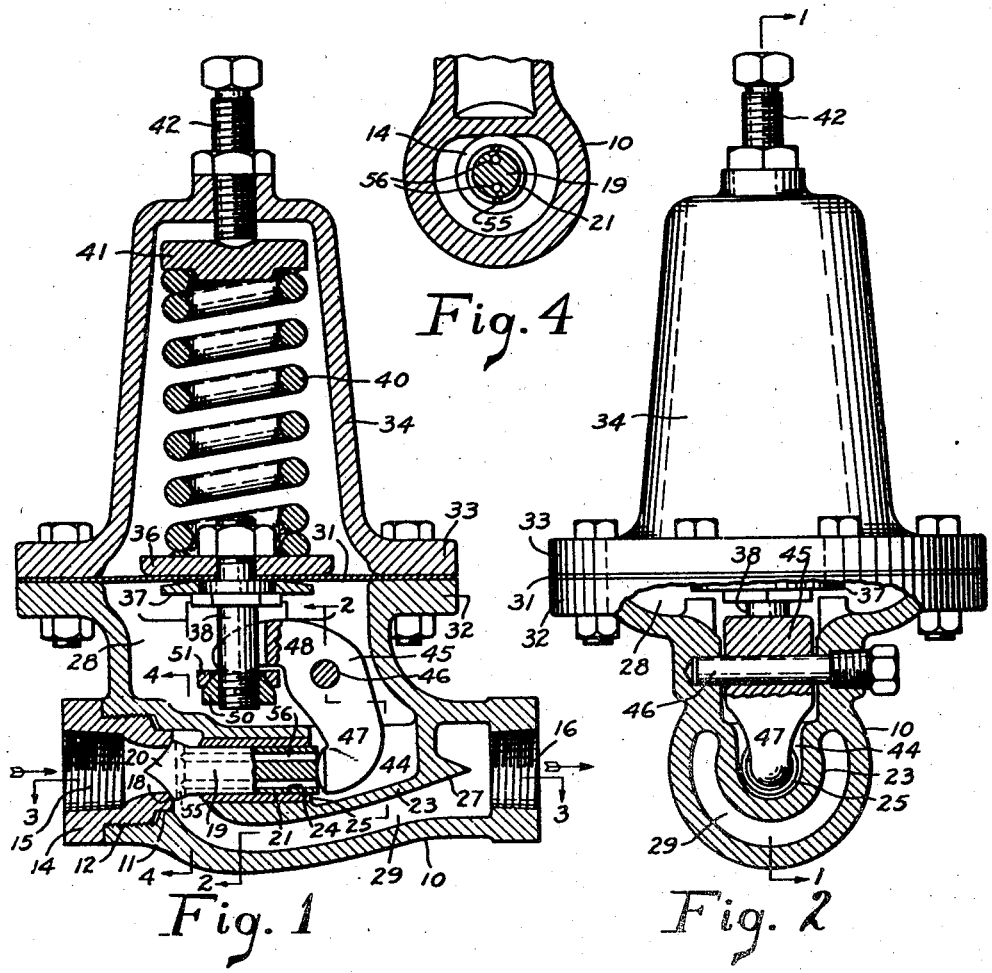
Fig. 1  Fig. 2  Fig. 3  Fig. 4
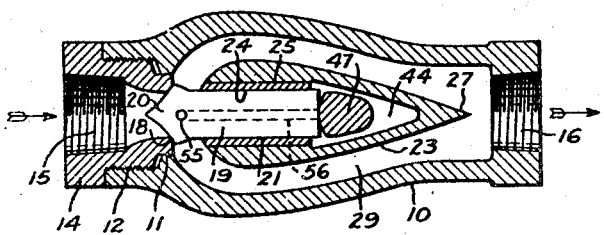
Inventor
PAUL C. TEMPLE
By Albert G. Blodgett
Attorney Patented Jan. 27, 1948

2,435,057

UNITED STATES PATENT OFFICE 2,435,057

PRESSURE REGULATING VALVE

Paul C. Temple, Decatur, Ill., assignor to A. W. Cash Company, Decatur, Ill., a corporation of Delaware Application May 14, 1943, Serial No. 486,929

1 Claim. (Cl. 50—26)

This invention relates to pressure regulating valves, and more particularly to valves of the type adapted to control the flow of a fluid and automatically maintain desired pressure conditions at the discharge side of the valve.

In a prior patent, Reissue No. 19,545, I disclosed a pressure reducing and regulating valve having certain novel and desirable features of construction. In this prior valve the various parts are so arranged that the fluid will travel in substantially a straight line through the valve, thus reducing energy losses caused by eddy currents and the like, and greatly increasing the capacity of the valve. In addition my prior valve utilizes the aspiring effect of the flowing fluid to obtain better regulation of the discharge fluid pressure. The present invention is in certain respects an improvement over my earlier construction.

It is one object of the invention to provide a pressure regulating valve having a fluid passage therethrough of improved streamline form adapted to reduce eddy currents to a minimum.

It is a further object of the invention to provide a pressure regulating valve which will utilize the aspirating effect of the flowing fluid to better advantage and thereby obtain better regulation of the discharge pressure, particularly at relatively low rates of flow.

It is a further object of the invention to provide a comparatively simple and inexpensive pressure regulating valve which will have a large capacity in proportion to its size, and which will afford very accurate regulation of the discharge pressure despite wide variations in the rate of the flow.

With these and other objects in view, as will be apparent to those skilled in the art, the invention resides in the combination of parts set forth in the specification and covered by the claim appended hereto.

Referring to the drawings illustrating one embodiment of the invention, and in which like reference numerals indicate like parts, Fig. 1 is a longitudinal section through a pressure regulating valve, the section being taken on the line 1—1 of Fig. 2;

Fig. 2 is a view of the valve partly in end elevation and partly in section on the line 2—2 of Fig. 1;

Fig. 3 is a section on the line 3—3 of Fig. 1; and

Fig. 4 is a section on the line 4—4 of Fig. 1.

The embodiment illustrated comprises a hollow body or casing 10 having at one side a circular opening 11 with a threaded counterbore 12 at its outer end. A bushing 14 is screwed into the counterbore 12, the inner portion of the bushing being reduced in diameter to fit closely within the opening 11. This bushing has an opening 15 therethrough which is threaded at its outer end so that an inlet pipe (not shown) may be readily connected thereto. At the opposite side of the casing 10 and in direct alignment with the inlet opening 15 there is provided an outlet opening 16 which is threaded to facilitate connection of an outlet pipe (not shown) thereto.

In order that the flow of fluid through the valve may be controlled, the inner portion of the bushing 14 is shaped to provide an annular valve seat 18 which surrounds the inlet opening 15. A valve member 19 is arranged to cooperate with this seat 18 in controlling the rate of flow, this valve member being slidable in direct alignment with the inlet opening 15. The outer end of this valve member is in the form of a conical head 20 which engages the seat 18, and the inner portion of the valve member is in the form of an elongated cylinder or stem 21 somewhat smaller in diameter than the head 20.

The valve member 19 is supported by means of a guiding and supporting structure 23 having a bore 24 for the reception of the cylinder 21. This bore may be formed in a separate cylindrical sleeve 25 which is pressed tightly into place, but in some cases the sleeve will be unnecessary, particularly if the casing 10 is made of bronze or other non-corrodible material. As best shown in Fig. 3, the supporting structure 23 is of streamline form, with a blunt nose spaced from the inlet opening 15, and the structure tapers smoothly and gradually along three sides from the nose to a comparatively sharp trailing end 27 near the outlet opening 16. The upper portion of the supporting structure 23 is integrally joined to the surrounding walls of the casing 10 so as to form a partition which divides the interior of the casing into an upper control chamber 28 and a lower outlet chamber 29. The outlet chamber 29 provides a passage through which fluid may flow in nearly a straight horizontal path directly from the inlet opening 15 to the outlet opening 16, the streamlined structure 23 causing a minimum of eddy currents and resultant loss of energy. Throughout most of its length the passage 29 is of U-shaped cross-section, as shown in Fig. 2.

The valve member 19 is actuated by means responsive to the fluid pressure in the control chamber 28. For this purpose the upper wall of this chamber is formed by a flexible diaphragm 31. The peripheral portion of this diaphragm is clamped between an annular flange 32 at the top of the casing 10 and a similar flange 33 at the bottom of a hollow cap 34, these flanges being bolted together. The central portion of the diaphragm is clamped between an upper pressure plate 36 and a lower pressure plate 37 which are connected by a central vertical bolt 38, this bolt forming a post which extends downwardly from the diaphragm. Within the cap 34 there is mounted a vertical coiled compression spring 40 with its lower end engaging the upper pressure plate 36 and its upper end engaging a button 41 which in turn engages the lower end of a vertical adjusting screw 42 threaded through the top of the cap 34. A recess 44 is provided in the top of the streamlined structure 23 and directly behind the bore 24. A bell-crank lever 45 is located within the control chamber 28 and fulcrumed upon a transverse pin 46 which is supported above the recess 44 by the side walls of the casing 10. This lever has one arm 47 which extends downwardly into the recess 44 to engage the rear end of the valve member 19, and a second arm 48 which is bifurcated and extends forwardly to straddle the central bolt 38. On the lower end of this bolt and beneath the arm 48 there is mounted a nut 50 with a spherical upper surface surmounted by a self-aligning washer 51 which engages the arm 48 thereabove. With this construction, an increase in the fluid pressure within the control chamber 28 will lift the diaphragm, rocking the lever 45 in a clockwise direction as viewed in Fig. 1, and sliding the valve 19 toward the seat 18. Upon a decrease in pressure within the control chamber, the spring 40 will move the diaphragm downwardly, which will permit the valve to move away from its seat under the influence of the high fluid pressure in the inlet opening 15.

The control chamber 28 is connected to the outlet chamber 29 in such a manner that when the valve is closed the fluid pressures in the two chambers will be equal, but when the valve is opened even slightly the resultant flow will create an aspirating effect which will reduce the pressure in the control chamber and cause the valve to open further. In this manner it is possible to maintain a substantially constant fluid pressure at the discharge opening 16 in spite of wide variations in the rate of flow.

In the preferred construction illustrated, the valve member 19 is provided with a transverse port 55 which extends diametrically through the valve directly behind the head 20 thereof. From this port 55 two passages 56 lead rearwardly through the cylindrical portion 21 of the valve to communicate with the recess 44 and thus with the control chamber 28. The passages 56 and the port 55 provide conduits through the valve member 19 connecting the recess 44 with the passage 29 adjacent the valve seat 18. When the valve is opened, the fluid will flow at comparatively high velocity through the annular space between the seat 18 and the valve head 20. In thus flowing rapidly past the port 55, this fluid will create the desired aspirating effect which will withdraw some fluid from the control chamber 28 through the passages 56 and port 55. This will allow the spring 40 to move the diaphragm 31 downwardly and permit the valve to open further.

The operation of the invention will now be apparent from the above disclosure. With no demand for fluid at the outlet 16, and with the pressure in the outlet chamber 29 and in the control chamber 28 sufficiently high, this pressure will support the diaphragm 31 against the downward pressure of the spring 40 and hold the valve 19 closed against the relatively high fluid pressure at the inlet opening 15. Upon a demand for fluid at the outlet 16, the pressure in the chambers 28 and 29 will be slightly reduced, the spring 40 will move the diaphragm 31 downwardly, and the pressure at the inlet opening 15 will force the valve 19 rearwardly away from its seat 18 and thereby permit fluid to flow through the chamber 29 to restore the desired pressure at the outlet 16. This flow will aspirate fluid from the ports 55, thus maintaining a lower pressure in the control chamber 28 than exists at the outlet 16, and causing the valve to open far enough to prevent the pressure at the outlet from dropping below the desired value even under conditions of heavy demand.

Since the flow from the inlet 15 to the outlet 16 takes place in substantially a direct line, and since the streamlined structure 23 creates a minimum amount of turbulence and resistance to flow, the valve is capable of handling fluids at rates of flow which are very high in proportion to the size of the valve. The inlet bushing 14 is the only part which is subjected to the high fluid pressure, and because of its small size it is feasible to make this part of a very strong and high grade material which is also adapted to provide a durable valve seat 18. Because of its cylindrical form and relatively small diameter, this bushing can withstand very high fluid pressures. The valve member 19 is of a simple and compact construction which will be relatively inexpensive to manufacture.

Having thus described my invention, what I claim as new and desire to secure by Letters Patent is:

A pressure regulating valve comprising a hollow casing having an inlet and an outlet arranged in substantially horizontal alignment, the inlet being surrounded by an annular valve seat, a partition dividing the interior of the casing into an upper control chamber and a substantially straight horizontal flow passage therebeneath connecting the inlet with the outlet, the partition including a structure mounted in the passage and having a blunt nose spaced from the inlet, the structure tapering smoothly and gradually along three sides from the nose to a comparatively sharp trailing end near the outlet, the passage being of substantially U-shape in cross-section adjacent the said structure, the said structure having a horizontal bore in the nose end thereof aligned with the inlet and a recess connected with the rear end of the bore and opening upwardly into the control chamber, a flexible diaphragm forming the upper wall of the control chamber, a post extending downwardly from the diaphragm in front of the recess, a valve member slidably supported in the bore and arranged to cooperate with the valve seat and thus control the admission of fluid through the inlet, the valve member having a conduit therethrough connecting the recess with the passage adjacent the seat and so located that the fluid pressure in the control chamber will be reduced by the aspirating effect of the fluid flow past the end of the conduit adjacent the seat, and a bell-crank lever fulcrumed on the casing above the recess, the lever having one arm which extends forwardly to connect with the post and a second arm which extends downwardly into the recess to engage the rear end of the valve member.

PAUL C. TEMPLE.

(References on following page)

REFERENCES CITED

The following references are of record in the file of this patent:

UNITED STATES PATENTS

| Number | Name | Date |
|---|---|---|
| 2,323,888 | Wright | July 13, 1943 |
| 1,885,389 | Temple | Mar. 1, 1932 |
| 859,088 | Lindmark | July 2, 1907 |
| 2,026,793 | McKee | June 7, 1936 |
| 2,278,728 | McKinley | Apr. 7, 1942 |

FOREIGN PATENTS

| Number | Country | Date |
|---|---|---|
| 8,206 | Great Britain | Apr. 8, 1913 |
| 370,907 | Great Britain | Apr. 12, 1932 |
| 207,004 | Great Britain | Nov. 22, 1923 |
| 194,606 | Great Britain | Mar. 15, 1923 |